United States Patent
Cable et al.

(10) Patent No.: US 6,570,868 B1
(45) Date of Patent: May 27, 2003

(54) SYSTEM AND METHOD FOR ESTABLISHING A COMMUNICATION CONNECTION

(75) Inventors: Julian Frank Barry Cable, Bishops Stortford (GB); Roy Harold Mauger, Radlett (GB); Mark Ashworth, Maidenhead (GB); James Shields, Wargrave (GB)

(73) Assignee: Nortel Networks Limited, St. Laurent (CA)

( * ) Notice: Subject to any disclaimer, the term of this patent is extended or adjusted under 35 U.S.C. 154(b) by 204 days.

(21) Appl. No.: 09/620,398

(22) Filed: Jul. 20, 2000

Related U.S. Application Data

(63) Continuation of application No. 08/907,521, filed on Aug. 8, 1997, now abandoned.

(51) Int. Cl.[7] .............................................. H04L 12/28
(52) U.S. Cl. ..................... 370/351; 370/401; 370/395.3
(58) Field of Search ................................ 370/351–356, 370/384–402, 463–467, 522; 379/88.17, 201, 207, 220–222

(56) References Cited

U.S. PATENT DOCUMENTS

| | | | | |
|---|---|---|---|---|
| 5,483,527 A | * | 1/1996 | Doshi | 370/465 |
| 5,568,475 A | * | 10/1996 | Doshi | 370/352 |
| 5,956,334 A | * | 9/1999 | Chu | 370/352 |
| 6,208,660 B1 | * | 3/2001 | Christie | 370/351 |

* cited by examiner

Primary Examiner—Steven Nguyen
(74) Attorney, Agent, or Firm—Barnes & Thornburg

(57) ABSTRACT

Narrowband subscriber terminals (40,52,58) of different narrowband networks are interconnected via a broadband network (48) that supports dissimilar signalling protocols to those maintained on the respective narrowband networks (40,52,58). A call server in a first narrowband network (40), in response to a call (100) from a first subscriber terminal (12) to a second subscriber terminal (68) in a second but different narrowband network (52), selects a phantom trunk (202) between the two networks. The phantom trunk has a unique circuit identity, which circuit identify is used in a first instance to relay to the second network an address of the second subscriber terminal (68). Then, in a second instance, the unique circuit identify is used to relay to the second network an address of the first subscriber terminal (68). By recognizing that two connection requests have been received at opposite ends of the same phantom trunk, a processor in the second network is able to determine that a direct connection between the first and second subscriber terminals is required through the broadband network (48).

19 Claims, 5 Drawing Sheets

SYSTEM AND METHOD FOR ESTABLISHING A COMMUNICATION CONNECTION

RELATED APPLICATION

This application is a continuation of U.S. patent application Ser. No. 08/907,521, now abandoned, filed Aug. 8 1997.

BACKGROUND TO THE INVENTION

This invention relates, in general, to a system and method for establishing a communication connection and is particularly, but not exclusively, applicable to network architectures that support differing resource capabilities and which combine narrowband call control, services and routing with broadband connectivity.

SUMMARY OF THE PRIOR ART

Globally, telecommunication systems are, generally, in a transitional phase between first generation, narrowband digital networks (such as the Global System for Mobile (GSM) cellular communication system) and future, multi-media digital networks (such as the Universal Mobile Telecommunication System (UMTS)) having broadband capabilities. This transition is necessarily required to support higher data rate communications, including video and internet applications, that are presently being both considered and made available. Unfortunately, this transitional phase also presents system operators with several dilemmas, and also prejudices immediate implementation of such broadband systems. For example, until such a time when a free-standing broadband system becomes an accepted and freely available standard for all subscriber terminals (such as cellular telephones and data transmission devices), system operators are reticent to write-off their significant investments in current narrowband infrastructure technology. Indeed, such narrowband infrastructure technology already provides a rich set of services and service creation environments which would have to be re-implemented to be deployed in broadband networks. Consequently, present-day narrowband systems must be adapted to accommodate both narrowband and broadband users; with this statement particularly relevant to call establishment and interworking procedures between these different forms of network.

For an effective migration between narrowband and broadband systems (for the transitional phase), system operators must particularly consider an interworking scenario when all subscribers connect to a. narrowband network, but one or more intermediate broadband networks are used to relay information between these narrowband subscribers.

In more detail, telecommunication networks comprise nodes connected by communication resources (usually termed "links"), with a particular network technology characterised by the means of transmission of user and control information along these links and also by the routing and relaying functions embodied in the nodes. The term routing is used to describe the process of determining the path the information will take through the network, while relaying is the process of transferring information from one link to another, i.e. the information is merely passed, without alteration, from one channel resource to another.

Taking GSM as an exemplary form of a narrowband digital network, user and control information (or "data") is interleaved, using time division multiplexing (TDM), on a 52 kbit per second (kbps) pulse code modulated (PCM) bearer channel. Indeed, these bearer channels can each framed to support four voice calls of 16 kbps, comprised from 13 kbps of sampled and encoded speech and 3 kbit/s of ancillary information, such as parity check and correction bits (and the like) and synchronisation information. Data is then relayed across a node by some form of synchronous TDM switching fabric, often of the 'time-space-time' type. Control information (e.g. call set up and tear down messages) logically follows the same path (although not always the same physical path) through the network as user information, and is terminated in each node for routing purposes. Routing is conventionally performed, in each node, on a 'hop-by-hop' basis using long lived routing tables, i.e. the node is sufficiently intelligent to determine an optimum route for the succeeding network connection.

Control information is regulated by a signalling scheme that is distinctive to the type of network employed. Particularly, public signalling systems are used between nodes of a public network and between public networks of different operators. Signalling System No. 7 is the only important example of a public signalling system. Access signalling systems are used between subscribers and edge nodes of public networks, e.g. between a radiotelephone and a base station subsystem (BSS). In fact, the most common digital access signalling schemes are Common Channel Signalling Systems, such as the Integrated Service Digital Network (ISDN) DSSS1 signalling schemes (and its predecessors) and Channel Associated Signalling schemes that are both derived from analog signalling. Private schemes are generally derived from access schemes but provide richer functionality within personal networks, such as within a secure private branch exchange (PBX).

On the other hand, broadband digital networks are characterised in that user and control information is transmitted in fixed or variable length 'packets', with these packets prepended with headers that contain bearer channel identification. In contrast with narrowband systems, user information is relayed across a node via an asynchronous switching fabric that examines each packet in turn (using some kind of fairness algorithm) and directs it to the appropriate output link in response to the input link and bearer channel identification. Routing and control information transmission is, however, similar to that for the narrowband case, and differs only inasmuch as the signalling schemes are technology specific.

To facilitate use of broadband networks and the migration of communication networks to high data rate technologies (e.g. the 2 Mbps rate envisaged within UMTS), there is a need to provide an effective mechanism for interconnecting narrowband networks through a transparent broadband ether. In other words, the broadband ether must accommodate and support narrowband signalling schemes without affecting either data integrity or in any way inhibiting data flow or interconnection.

SUMMARY OF THE INVENTION

According to a first aspect of the present invention there is provided a method of establishing a communication connection across a broadband network from a first terminal in a first narrowband network to a second terminal in a different narrowband network, the broadband network having a signalling protocol dissimilar to those provided in the respective first and second narrowband networks, the method comprising the steps of: at the first narrowband network and on a first communication circuit, receiving an incoming call request from the first terminal, the incoming call request containing an address of the first terminal and a destination address associated with the second terminal; selecting a phantom trunk different to the first communication circuit, the phantom trunk having a circuit identity and being arranged to support a narrowband communication between the first narrowband network and the second narrowband network; in a first message, sending the destination address and the circuit identity from the first narrowband network to the second narrowband network; in a second message, sending the circuit identity and the address of the first terminal to the second narrowband network; identifying the presence of the circuit identity in both the first message and the second message to establish that the communication connection is between the first terminal and the second terminal; and establishing the communication connection through the broadband network.

In a second aspect of the present invention there is provided a communication system having a broadband network and a plurality of narrowband networks each containing at least one communication device, the narrowband networks having differing signalling protocols to those of the broadband network and wherein the narrowband networks are interconnected through the broadband network, the communication system arranged to establish a communication connection between a calling communication device in a first narrowband network and a receiving communication device in a different narrowband network, each of the at least one communication devices having an address, each of the plurality of narrowband networks comprising: a call server responsive to a call request message generated by the calling communication device, the call request message containing the address of the calling communication device and a destination address associated with the receiving communication device, the call server being arranged to identify a circuit identity associated with a first communication circuit used to send the call request message to the call server; means for selecting a phantom trunk different to the first communication circuit, the phantom trunk having a circuit identity and being arranged to support a narrowband communication between the first narrowband network and the different narrowband network; means for sending, in a first message, the destination address and the circuit identity from the first narrowband network to the second narrowband network; means for sending, in a second message, the circuit identity and the address of the calling communication device to the second narrowband network; means for identifying the presence of the circuit identity in both the first message and the second message to establish that the communication connection is between the calling communication device and receiving communication device; and means for establishing the communication connection through the broadband network.

In another aspect of the present invention there is provided a connection broker arranged to orchestrate interconnection of a first narrowband communication unit of a first narrowband network to a second narrowband communication unit of a different narrowband network via a broadband network, the broadband network having dissimilar signalling protocols to those provided in the respective first and different narrowband networks, the first narrowband communication unit and the second narrowband communication unit each having an address, the connection broker coupled to a call server that is responsive to a call request message generated by the first narrowband communication unit, the call request message containing the address of the first narrowband communication unit and a destination address associated with the second narrowband communication unit, the call server being arranged to identify a circuit identity associated with a first communication circuit used to send the call request message to the call server and having means for selecting a phantom trunk different to the first communication circuit, the phantom trunk having a circuit identity and being arranged to maintain a narrowband communication between the first narrowband network and the different narrowband network, the call server further including means for sending, in a first message, the destination address and the circuit identity from the first narrowband network to the second narrowband network, the connection broker comprising: means for sending, in a second message, the circuit identity and the address of the first narrowband communication unit to the second narrowband network; and a processor, responsive to the receipt of the first message and the second message, for identifying the presence of the circuit identity in both the first message and the second message to establish that the communication connection is between the first narrowband communication unit and the second narrowband communication unit.

Advantageously, the present invention allows the interconnection of different narrowband networks through a broadband network notwithstanding that no common signalling protocols exist between the narrowband and broadband networks.

BRIEF DESCRIPTION OF THE DRAWINGS

An exemplary embodiment of the present invention will now be described with reference to the accompanying drawings, in which.

DETAILED DESCRIPTION OF A PREFERRED EMBODIMENTS

There are, apparently, two principal ways of implementing the interconnection of narrowband subscribers units through an intermediate broadband network, such as an asynchronous transmission mode (ATM) architecture; either an interworking function can be implemented at each boundary between the narrowband and broadband networks (in which a dedicated and reversible coding transposition is applied to the respective narrowband/broadband information), or narrowband information can be encapsulated over a broadband subnet whereby the narrowband information is packaged with a broadband frame structure (so entirely maintaining the integrity and format of the original encoded narrowband information). In relation to user information, e.g. encoded speech or specific data traffic, the present invention has identified that both the interworking function and encapsulation mechanisms are possible and merely represent an additional process step that complicates and extends the requirements for coding within communication systems, generally. However, in relation to control information (which is required to establish and maintain a connection), there are a number of penalties and benefits associated with both of the above approaches. Specifically, encapsulation allows existing services to be supported, even though these services may not independently be sustained by the broadband network. Furthermore, encapsulation is simple to implement. On the other hand, interworking requires only a local view at each interworking point (i.e. at the narrowband/broadband boundary), and also provides a mechanism that can support the participation of narrowband and broadband subscribers in a single call. The present invention utilises an inventive combination of both the interworking and encapsulation mechanisms to provide enhanced and synergistic system capabilities that are not provided by the straightforward use of either base mechanism.

Figure 1:
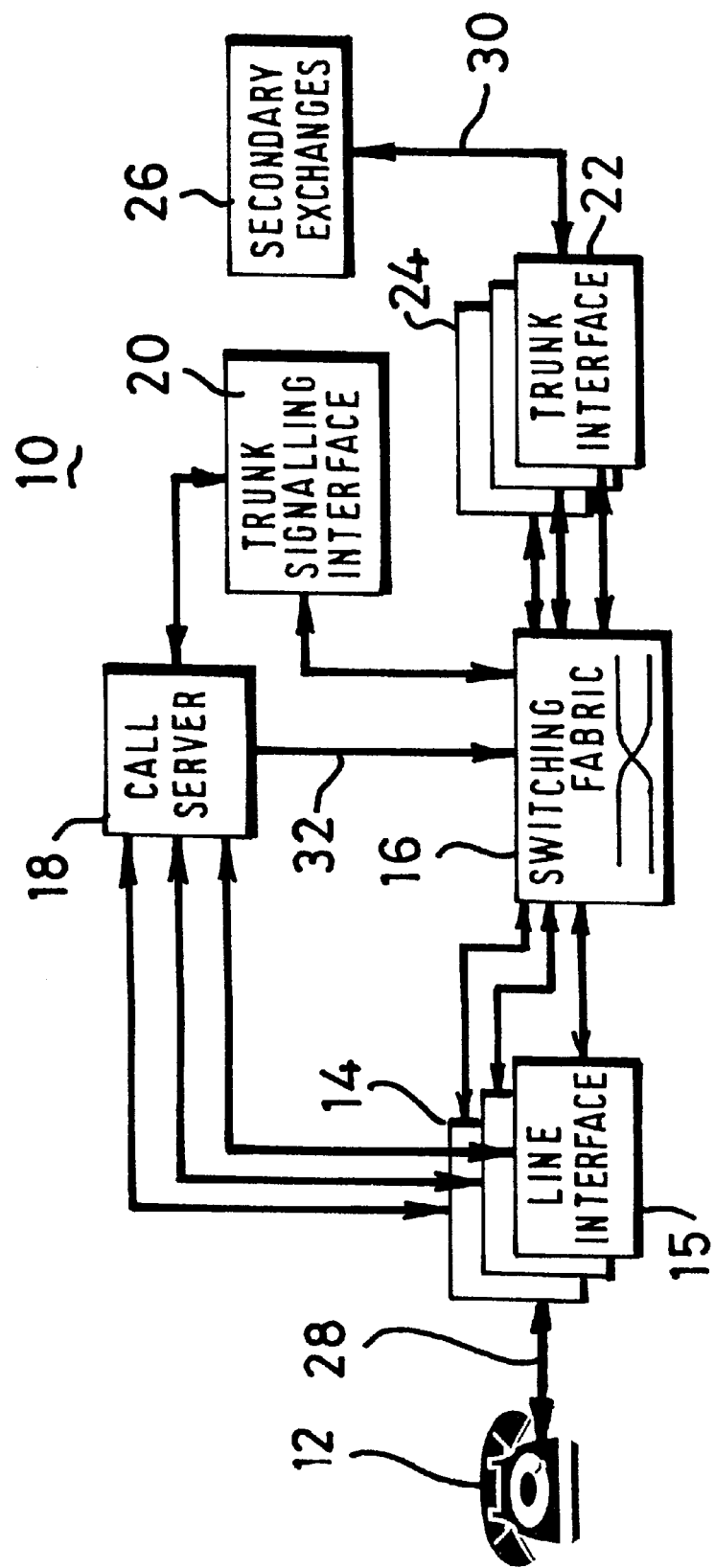
FIG. 1 is a block diagram illustrating an abstract model of a narrowband communication node.

Referring to FIG. 1, a block diagram illustrating an abstract model of a narrowband communication node 10 is shown. A number of subscriber terminals 12, such as landline telephones or modems, are coupled, typically, to a plurality of line interfaces 14–15 (although only one need be supplied for an operational system). The plurality of line interfaces 14–15 are each connected to a switching fabric 16 that is arranged to route an input of the switching fabric 16 to an appropriate output thereof, as will readily be appreciated. The plurality of line interfaces 14–15 are also coupled (usually on an individual basis) to a call server 18 arranged to administer and control, for example, the set-up and tear-down of calls across the narrowband network 10. The call server 18 is further coupled to the switching fabric 18. A trunk signalling interface 20, that acts to decode and interpret signalling schemes used within the narrowband network 10, is coupled between the call server 18 and the switching fabric 16. Outputs from the switching fabric 16 are coupled to a plurality of trunk interfaces 22–24 (although only one need be supplied for an operational system). The plurality of trunk interfaces are further coupled to secondary exchanges 26, such as PBXs or BSSs, within the narrowband network 10.

As will be appreciated, the term "subscriber terminal" is used merely to describe a particular endpoint connection for a line or trunk interface.

User information (traffic) 28–30 enters the narrowband infrastructure via line interfaces 14–15 or trunk interfaces 22–24. Control information from individual subscribers enters via the line interfaces 14–15, whereas control information, i.e. inter-node signalling, from connected trunked networks (e.g. the secondary exchanges 26) can enter either via the same trunks as the traffic 30 or through the use of dedicated channel resources (not shown). The call server 18 processes incoming call requests and selects an appropriate outgoing trunk or line, as will readily be appreciated. More particularly, the call server 18 (through the switching fabric 16) controls the connection of specific lines to specific trunks across through the use of fabric control messages 32 that specify the making and breaking of connections between subscriber terminals 12.

While most calls in narrowband systems are two-way, it is helpful to introduce, at this time, the nomenclature associated with one-way connections, namely the connection (TA, TB) refers to the one-way connection from terminal TA to terminal TB while (TB, TA) refers to a complementary (or independent supported) connection in the reverse direction.

Figure 2:
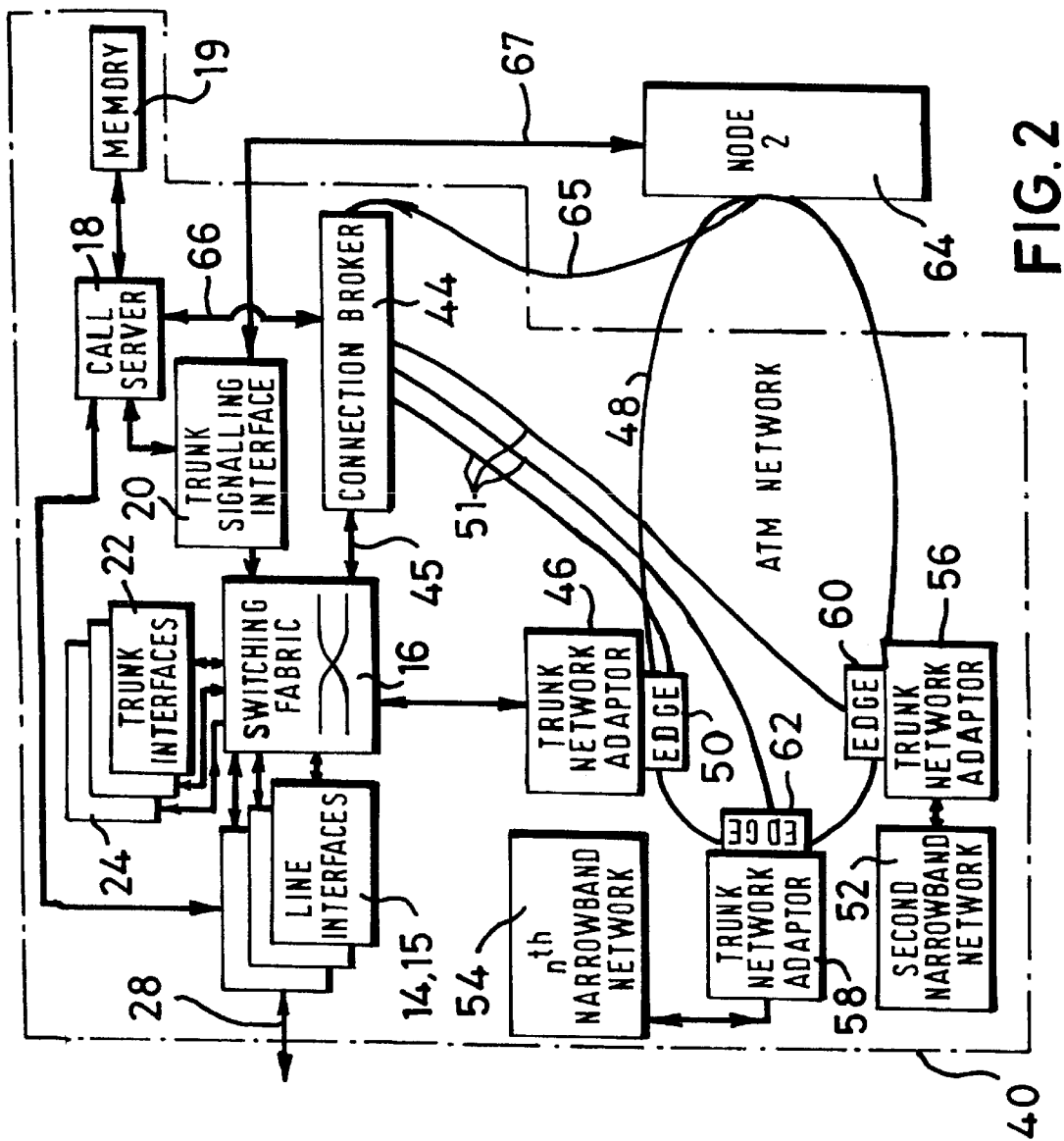
FIG. 2 is a block diagram illustrating, in accordance with a preferred embodiment of the present invention, the interconnection of subscriber terminals between narrowband and broadband networks.

Turning now to FIG. 2, there is shown a block diagram, in accordance with a preferred embodiment of the present invention, of the interconnections of subscriber terminals between narrowband and broadband networks. In this figure, case a broadband network is used to transport the user and/or control information. To facilitate an understanding of the architectural differences between the prior art and the preferred embodiment of the present invention, common infrastructure is labelled with identical reference numerals.

At a first node 40, a number of subscriber terminals, such as landline telephones or modems (not shown for the sake of clarity), are coupled, typically, to a plurality of line interfaces 14–15 (although only one need be supplied for an operational system) of a narrowband system. The plurality of line interfaces 14–15 are each connected to a switching fabric 16 that is arranged to route an input of the switching fabric 16 to an appropriate output thereof. The plurality of line interfaces 14–15 are also coupled (usually on an individual basis) to a call server 18 arranged to administer and control, for example, the set-up and tear-down of calls across the narrowband network. The call server is coupled to a memory that is arranged to store, amongst other things, circuit indicators codes (CICs) associated with both real trunks and phantom trunks. More particularly, the memory can record a "busy" or "vacant" status against each of these real or phantom trunks. The call server 18 is further coupled to a connection broker 44, which in turn is coupled to the switching fabric 18 via bus 45. The connection broker 44 represents a first departure in the system architecture of the preferred embodiment of the present invention from that of prior art FIG. 1. A trunk signalling interface 20, arranged to act to decode and interpret signalling schemes used within the narrowband network, is coupled between the call server 18 and the switching fabric 16. Outputs from the switching fabric 16 are coupled to a plurality of trunk interfaces 22–24, (although only one need be supplied for an operational system. The plurality of trunk interfaces are again coupled to secondary exchanges (not shown for the sake of clarity), such as PBXs or BSSs, within the narrowband network.

The switching fabric 16 is further coupled to a first trunk network adapter 46 that allows interconnection and interoperability of the narrowband network with a broadband network 48 implemented, for example, for asynchronous transmission mode (ATM) operation. More particularly, interconnection of the trunk network adapter 46 is through a broadband network edge switch 50, that is coupled to and hence controlled by the connection broker 44 by control lines 51. The combined function of the trunk network adapter 46 and the broadband network edge switch 50 will be described subsequently. Other narrowband networks 52–54 are coupled, in a similar fashion, to the broadband network 48 via respective trunk network adapters 58–60 and broadband network edge switches 60–62. As will be appreciated, other narrowband networks 52–54 will be realised through infrastructure architectures similar to that described immediately above.

The broadband network 48 is further coupled to a second node 64, typically a different network, which is also responsive to the connection broker 44 via connection 65. The second node 64 is also arranged to be in communication with the trunk signalling interface 20 via communications bus 67. Additionally, as will be understood, the broadband network may support point-to-point broadband communications, such as video telephony between subscriber terminals (not shown).

As will be appreciated, the terms node and exchange are interchangeable and are used to describe stand-alone networks, e.g. distinct narrowband networks operated by different operators.

According to the preferred embodiment of the present invention, narrowband signalling within the communication system, generally, is controlled by the call server 18, while broadband signalling, i.e. signalling that may be sent between different narrowband networks 52–54 via the intermediate broadband network 48, is controlled by the connection broker 44. Consequently, the call server 18 is not concerned with broadband signalling interconnection and operation.

According to the present invention, therefore, the narrowband line interfaces 14–15, trunk interfaces 22–24 and switching fabric 16 are supplemented by a broadband network 48 and trunk (i.e. narrowband/broadband) network adapters 46, 56–58 that act to provide gateway functionality. Specifically, the trunk network adapters 46, 56–58 perform traffic (user information) inter-working functions and signalling (control information) encapsulation, with the signalling ultimately relayed back to a call server 18.

A principal feature of a preferred embodiment of the present invention is the new function performed by the connection broker 44, which function is used to provide a uniform connection abstraction 66 for the call server 18, independent of whether the connection crosses (and is retained entirely within) the narrowband network or the broadband network, or in the case where the connection crosses both the narrowband and broadband networks. This necessitates use of a uniform terminal name space identity (i.e. a standardised address format) for all terminals across the entire communication system, i.e. both narrowband and broadband systems.

For a narrowband to narrowband connection in a single narrowband network (e.g. owned by a particular operator), the connection broker 44 passes the connection messages to the switching fabric 16 (via connection 32), and therefore acts transparently in order to appear identical in function to the prior art FIG. 1. The switching fabric 16 of the narrowband network then establishes the connection in accordance with known techniques, and does not utilise the broadband network 48. For a broadband to broadband connection, the connection broker 44 instructs the broadband network and/or trunk network adapters 46, 56–58 to make or break a call connection, and therefore mimics standard broadband operation.

For a narrowband to broadband connection, however, both actions must be performed contemporaneously. Specifically, the connection broker 44 both instructs the switching fabric 16, through the call server 18 in the narrowband network, to hold open a routing path for a call and negotiates with a trunk network adapter 46 of the broadband network for the allocation of a suitable channel resource. Once both paths have been determined, the connection broker 44 sends dedicated messages to the switching fabric 16 and the trunk network adapter 46 to establish the connection. This achieves the connection abstraction as seen by the call server.

In an operational communication system, compatibility between operators is desirable, if not essential. As such, establishing an interconnection (usually termed a "gateway"), between different "mixed nodes" is a significant issue. In this context, the term "mixed nodes" is used to describe different networks, operated by different operators, that each typically have switchable narrowband/broadband capabilities and defined service capabilities. However, intermediate broadband networks may not be able to support these services (or any service of similar nature) nor be to interpret narrowband control channel signalling required to set-up a defined narrowband services, i.e. there are different signalling protocols between the different adjacent exchanges. Therefore, a preferred embodiment of the present invention provides a mechanism for establishing interconnection of narrowband networks through an intermediate broadband network, while eliminating the requirement for the broadband network to assimilate the narrowband control channel signalling regimes and format. In this case, the interconnection of the narrowband networks (through the intermediate broadband network 48) requires the functional co-ordination of separate call servers and connection brokers located in the respective networks.

Figure 3:
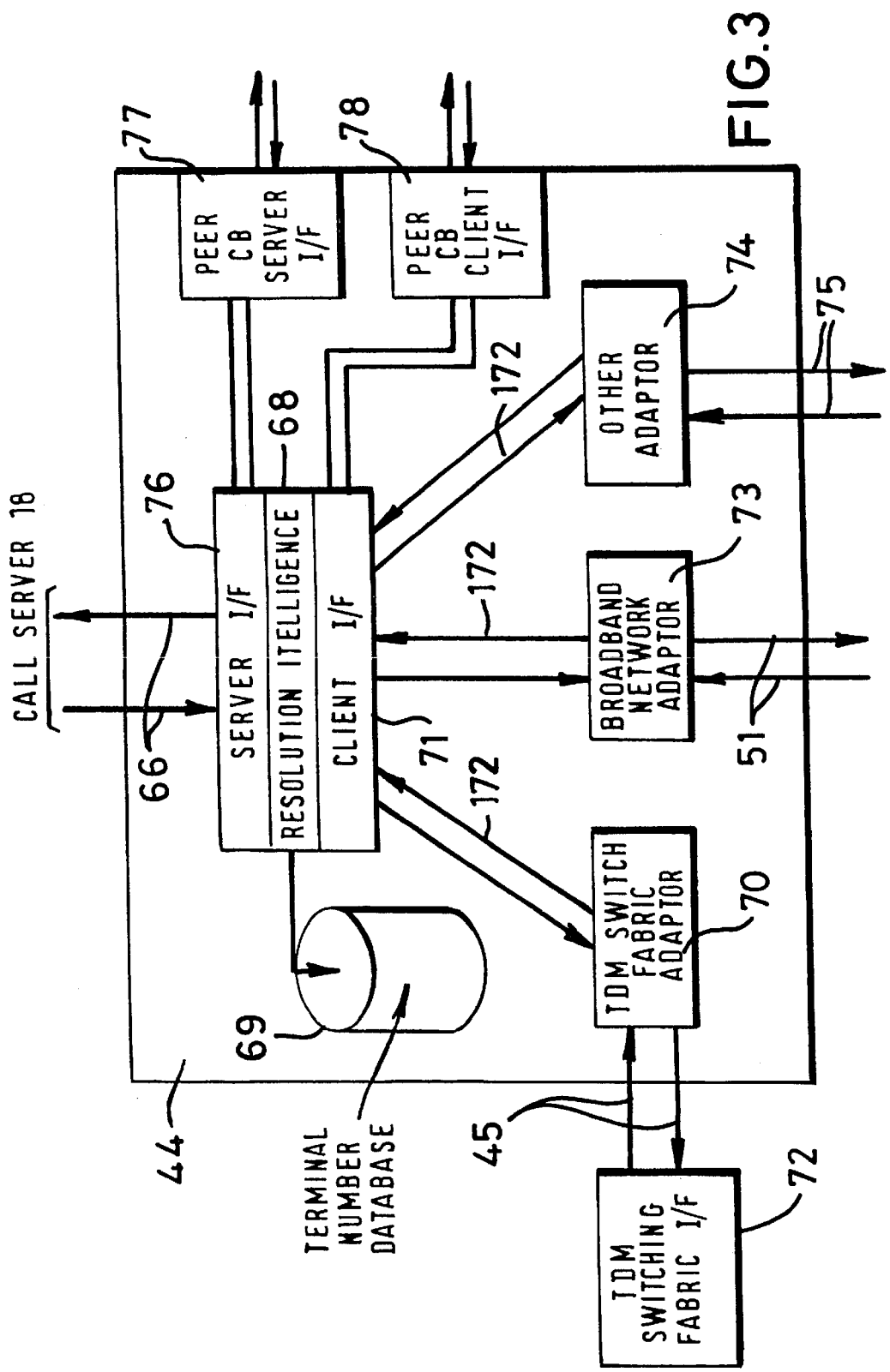
FIG. 3 illustrates an abstract architecture for a connection broker of a preferred embodiment of the present invention.

Turning to FIG. 3, an abstract architecture for a connection broker 44 of a preferred embodiment of the present invention is shown. Although a hardware implementation is dependent upon (and hence determined by) by specific requirements, a typical implementation extends the capabilities of an existing, prior art narrowband telephone exchange. By way of example and explanation only, the connection broker 44 of FIG. 3 contains resolution intelligence 68 that typically realised as a processor. The function of the resolution intelligence 68 will be described subsequently. A terminal number data base 69 that maps the uniform terminal numbers onto network-specific location addresses is coupled to the resolution intelligence 68. A time division multiplexed (TDM) switch fabric adapter 70 (in the case of a TDM narrowband system) provides protocol conversion between the resolution intelligence 68 (via a client orientated interface port 71) and a TDM switching fabric interface 72 (analogous to the switching fabric 16 of FIG. 2). Typically, a dedicated connection protocol 72 is utilised between the resolution intelligence 68 and the TDM switching fabric adapter 70, although this need not be the case. A broadband network adapter 73 is also coupled through the client interface port 71 to the resolution intelligence 68, with communication between the resolution intelligence 68 and broadband network adapter 73 typically based on the dedicated connection protocol 72. The broadband network adapter is analogous to the trunk network adapter 46 of FIG. 2. Other adapters 74 for ancillary networks or services may also be coupled to the resolution intelligence 68 via the client interface 71. The broadband network adapter 73 and the other adapters 74 will accordingly be respectively coupled to the broadband network edge switch 50 via control lines 51 or appropriate communication resources 75. The resolution intelligence is also coupled to a server interface port 76 that provides an interconnection facility, via lines 66, to call server 18. The server interface port is also coupled through a secondary port 77 (termed a "peer connection broker server interface") arranged to interconnect the resolution intelligence 68 of the connection broker 44 to another connection broker (shown in FIG. 4). Similarly, the client interface port 71 is also coupled to a ternary port 78 (termed a "peer connection broker client interface") arranged to couple the resolution intelligence 68 of the connection broker 44 to a subscriber terminal principally connected to another connection broker (as shown in FIG. 4).

Prior art telephone exchanges typically have a distributed processing architecture with multiple fault-tolerant processors and an inter-processor communications facility, while the switching fabric may be supported by a special purpose processor, as will be understood.

In the preferred embodiment of the present invention, the connection broker 44 supports a set of real-time processes within a single fault tolerant processor, i.e. within the resolution intelligence 68. The inter-processor communications facility (supported by the dedicated connection protocols 72) of the connection broker is used to communicate with the switching fabric 16 and the call server 18. As has been previously described, the connection broker 44 typically incorporates broadband interfaces to enable control of the broadband network, although the connection broker may use the inter-processor communications facility to access the broadband interfaces on the trunk network adapters. However, as communication networks evolve to be more broadband orientated, the call server 18 and connection broker 44 may reside on processors with only broadband interfaces that are connected directly to the broadband network 48. The narrowband connection fabric would then be provided with a broadband control interface.

Figure 4:
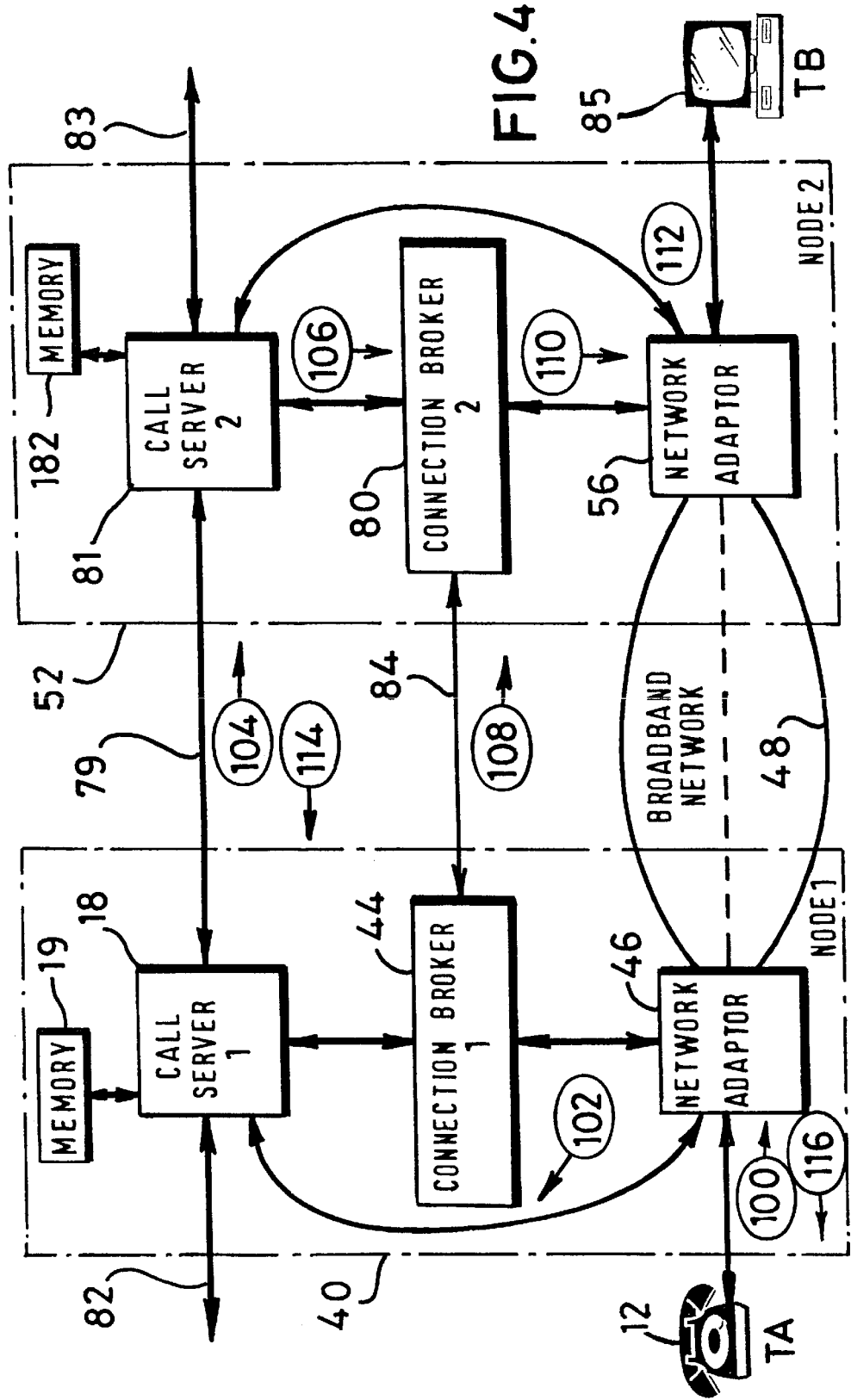
FIG. 4 is a representation of a system architecture and associated mechanism by which a preferred embodiment of the present invention connects subscriber terminals across an intermediate broadband network.

A system architecture and associated mechanism by which a preferred embodiment of the present invention connects subscriber terminals across an intermediate broadband network is shown in FIG. 4. In order for a data call, for example, to be supported between terminal TA (e.g. a land line telephone identified by reference numeral 12) on a first node 40 and terminal TB (e.g. a modem within a computer, identified by reference numeral 85) on second node 52, the preferred embodiment of the present invention utilises the existence of a common signalling relation between both narrowband nodes. It is the establishment of a common narrowband signalling link (or resource) 79 and protocol that is essential to the system of the present invention; the broadband network need only have the capability of relaying traffic between the narrowband networks. The broadband network consequently appears as a transparent channel resource since no modification of the narrowband traffic is required.

The first node 40 and the second node 52 both contain trunk network adapters 46, 56, connection brokers 44 and 80, and call servers 18 and 81 which are coupled permanently together over the common narrowband signalling link 79 that provides a plurality of virtual (or "phantom") traffic trunks. The call servers 18 and 81 are therefore potentially connected to other call servers (not shown) of different narrowband networks (not shown) by additional signalling resources 82–83. The call servers 18 and 81 are respectively coupled to connection brokers 44 and 80, which in turn are coupled to respective trunk network adapters 46 and 56. The trunk network adapters 46 and 56 are coupled together through a broadband network 48, while the connection brokers 44 and 80 are interconnected by a virtual link 84. Terminal TA 12 is coupled to trunk network adapter 46, while terminal TB 85 is coupled to trunk network adapter 56.

In a preferred embodiment of the present invention, the signalling link 79 is realised a permanent connection between the two call servers 18 and 81, although this connection may be dynamically assigned or provided by a radio frequency link. Indeed, in a scenario where the first node 40 and second node 52 pre-exist as narrowband gateway nodes between network A and network B, real narrowband E1 trunks already exist between these two exchanges and, as such, signalling can be carried in a time-slot of these E1 trunks, i.e. conventionally in time-slot sixteen. Alternatively, in a North American-based system, the two different exchanges could be connected to a common STP network. Once the broadband network 48 is in place, however, supplementary signalling bandwidth can be supported by establishing links through the broadband network. Nonetheless, these multiple paths represent a single logical "signalling relation" by which SS7 user parts (i.e. the call servers) are able to communicate and interact.

The virtual link 84 established between the two connection brokers 44 and 80 offers a permanent "ability to communicate". In a preferred embodiment, the virtual link 84 therefore takes the form of an ATM virtual channel connection. However, it is also possible for an SS7 network to be used as the bearer for this communication, e.g. in relation to a TCAP application. The communication links between the connection brokers 44 and 80 and both the network adapters 46, 56 and the switching fabrics are also permanent, while connections that carry traffic between the network adapters 46, 56 and the interconnected subscriber terminals TA 12, 85 are made and broken for the duration of a specific call or for particular portions of those calls.

The system of the preferred embodiment of the present invention operates by virtue of the provision of at least two (and probably tens to thousands of) assignable signalling channel resources or "phantom trunks" between the respective switching fabrics, principally residing between the respective call servers 18 and 81 and respective connection brokers 44 and 80. The nodes then utilise narrowband signalling to simulate the presence of virtual (or "phantom") terminals at either node. The preferred embodiment of the present invention considers that these phantom trunks are dedicated to a single node and, as such, only allow the formation of a call in one direction from the first node 40 to the second node 52 or vice versa. Thus, a phantom route between the two nodes consists of two groups of phantom trunks, one in each direction. By this mechanism, undesirable effects which could otherwise occur if the same phantom trunk was seized by each node trunk are prevented. Beneficially, the phantom trunks do not tie up real communication resources that exist between the respective narrowband networks.

Figure 5:
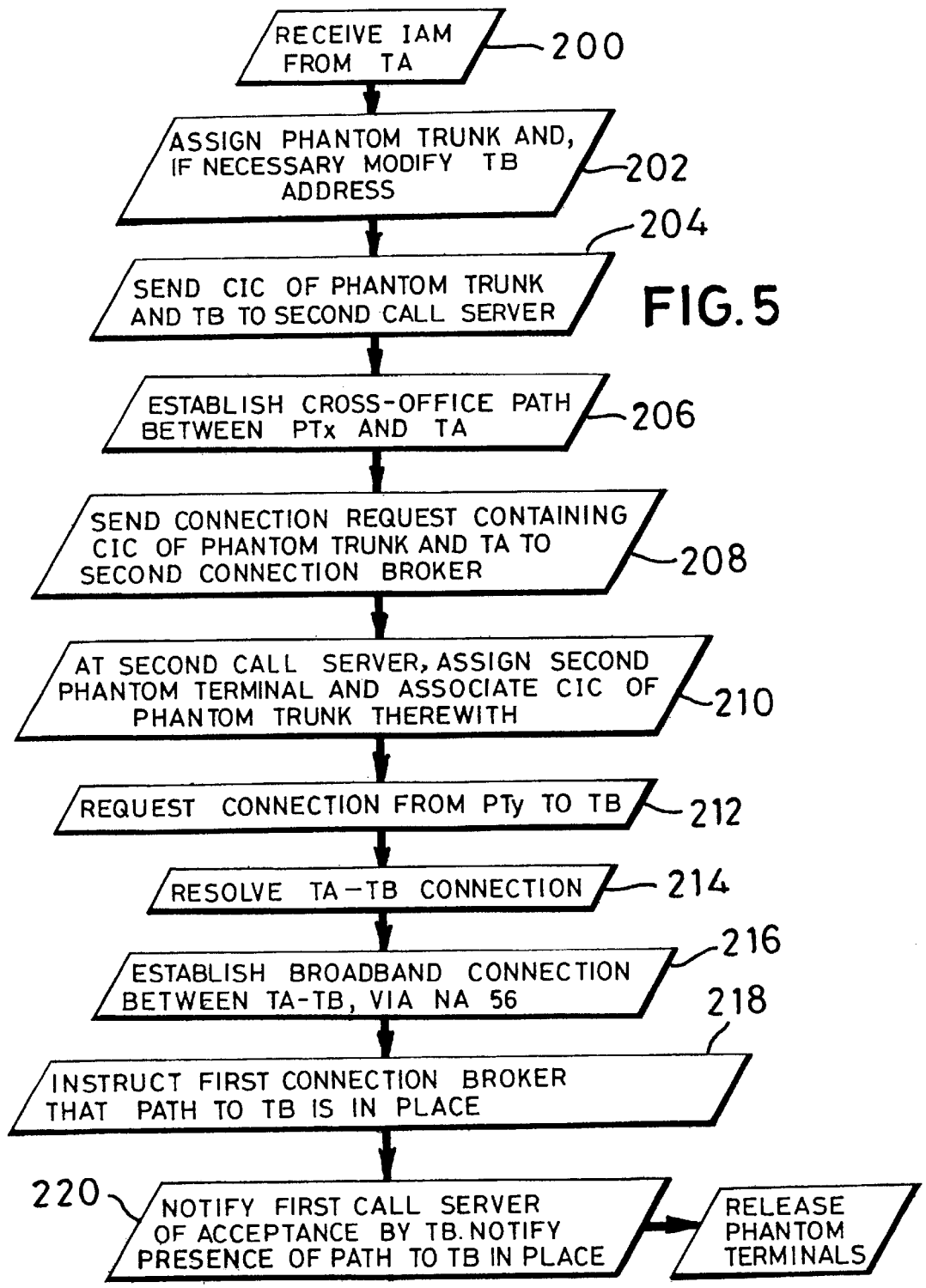
FIG. 5 is a flow diagram illustrating, in accordance with a preferred embodiment of the present invention, the procedural steps required to establish a multi-node communication across a broadband network.

In relation to the structure, content and function of call set-up messages between different exchanges (i.e. different nodes), this can best be understood with reference to FIG. 4, the flow diagram of FIG. 5 and the subsequent tabulated summary of message functions.

An incoming call (or "initial address message", IAM) from terminal TA is received 200 at the first node 40, whose call server 18 receives the incoming message and determines that the call must be routed to the second node 52. The incoming call will at least contain a CIC relating to the trunk assigned between TA and the call server 18 together with a telephone number of the called party, namely TB in this example. The telephone number does not otherwise provide any indication of a port address to be used by TB in any subsequent communication and therefore principally acts to provide a routing instruction for use by the call servers. As such, the telephone number merely represents an address location of TB, although it may need to be subsequently transposed in order to arrive at a valid cross-node address.

In response to receipt of the incoming call and to save real communication resources (i.e. real communication links that can support 64 kbps speech, for example), the first call server 18 selects a free phantom terminal PTx and then uses this phantom terminal to establish 202 a phantom trunk between itself and a second call server 81 located in second node 52. Indeed, the call server 18 selects an available, node-unique ("disjoint") address field indicative of the free phantom terminal PTx from its associated memory 19. The free phantom terminal PTx, in fact, identifies a terminating address of the phantom trunk.

Typically, a phantom terminal identity is comprised from point codes associated with the two call servers 18, 81 and the CIC of the phantom trunk. In this instance, ordering of the point codes of the two call servers will identify a relative direction for the communication.

The first call server 18 then utilises the phantom trunk to relay 204 a modified call message (to the second call server 81 of the second node 52) comprised from a CIC associated with the phantom trunk together with the valid telephone number of TB. The second call server 81 is therefore able to utilise the telephone number of TB to "wake-up" or alert TB to the fact that there is something in the communication system that will be of interest to TB, albeit that TB is yet to receive any meaningful information. Unfortunately, at this time, the CIC pertaining to the connection between TA and the first call server 18 has been "lost" to the second node 52 since it is neither communicated nor encoded within the modified call message. In other words, the call server 18 of the first node 40 notifies the call server 81 of the second node 52 about the incoming call 100 by sending 104 a modified incoming call message on a phantom trunk, and thus passes on the dialled digits (i.e. the address of the called party) received from TA.

Furthermore, in response to the incoming call 100, the connection broker 44 of the first node 40 is arranged to establish 206 a phantom cross-office path between PTx and TA, with information pertaining to this cross-office path typically stored in the terminal number data base 69 by the resolution intelligence 68. In other words, terminal TA is coupled to phantom terminal PTx. Also, the preferred embodiment of the present invention is arranged such that the first connection broker 44 is triggered into action by the communication of the modified call message (to the second call server 81). Specifically, substantially contemporaneously with the sending of the modified call message, the first connection broker 44 of the first node 40 notes that the phantom terminal PTx is one end of an outgoing phantom trunk to the second node 52. The first connection broker therefore passes 208 a connection request 106 to the second connection broker 80 via virtual link 84, which connection request contains the CIC of the phantom trunk and the identity of TA (possibly derived from the original CIC assigned to the trunk between TA and the first call server 18). In the preferred embodiment, though, the actual address of the call-originating unit, i.e. TA, is sent.

The second node 52 reacts to the modified incoming call message (received on the phantom trunk) by mapping 210 the received circuit indicator code (CIC) of the phantom trunk onto an associated second phantom terminal PTy. Again, the second phantom terminal PTy has been selected by the second call server 81 of the second node 52 from its associated memory 82, with the memory up-dated to record that PTy represents a terminating point of the phantom trunk. Selection of the phantom terminal PTy is on a unique basis.

The second node 52, in response to the second call server 81 receiving the modified incoming call message, already appreciates that the destination of the incoming call ultimately lies with terminal TB. Therefore, at an appropriate time, the second call server 81 requests 212 a connection from TB to the second phantom terminal PTy (in the form of a second phantom cross-office path request between the phantom trunk and the called subscriber TB), and offers the incoming call request to TB using conventional signalling.

Furthermore, the resolution intelligence of the second connection broker 80, in response to receiving (in any order) both requests resolves out 214 the two phantom terminals PTx and PTy, converting the two requests "Connect TA to PTx" and "Connect TB to PTy" into the single real connection request "Connect TA to TB". Specifically, the second connection broker 80 is able to deduce the fact that there is a common CIC for the phantom trunk, and so the requirement for a direct connection between TA and TB is identified by virtue of this commonality. The second connection broker 80 then makes an actual trunk connection 216 between TA and TB via the second trunk network adapter 56. At about the same time, the second connection broker 80 (of the second node 52) instructs 218 the first connection broker 44 (of the first node 40) that the path to TB is in place.

Acceptance by the terminal TB of the call, and confirmation of the connection by the second call broker 80 is notified from the second call server 81 to the first call server 18, and the first connection broker 44 also notifies 116 its associated call server 18 that the path to TB is in place. At this point 220, the first call server 18 may start billing the call.

The phantom trunk remains intact for the whole duration of the call, with tear-down of the broadband connection operating in a complementary sense to the call set-up procedure describes in detail above. The skilled addressee will appreciate that to clear-down a broadband call, the call servers may clear a call using standard procedures for a narrowband (or SS-7) communication, as will readily be appreciated. Particularly, as part of this procedure, both call servers will issue requests to their respective connection brokers. Thereafter, the connection broker at the outgoing end of the phantom trunk will pass its release request onto the other connection broker by sending the CIC of the phantom trunk. The terminating connection broker will issue a clear-down of the broadband connection on receipt of whichever of the two messages it receives first. It is noted that the phantom trunk is not re-useable until both call servers have been told (by their respective connection brokers) that the broadband connection has cleared.

The functions performed by the principal message signalling are summarised in the table immediately below:

| Message | Function | Content |
| --- | --- | --- |
| 100–102 | Incoming Call | Identifies address of destination terminal and initial CIC to TA. |
| 104 | IAM | On selected phantom trunk, first connection broker 44 sends modified incoming call message containing destination dialed digits and circuit identification code (CIC) for phantom trunk/phantom terminal PTx. |
| 106 | Connection Request | Second node maps phantom trunk CIC onto associated phantom terminal PTy. Second call server receives real terminal number for TB and connection attributes, such as bit-rate, coding, etc. |
| 108 | Connection Request | First connection broker sends phantom trunk CIC, real terminal number for TA and connection attributes to second connection broker. |
| 110 | Broadband Connection Request | For proxy signalling, use a proxy signalling link for NA 56. Include a destination broadband network address (NSAP) for TA and the VPI/VCI for TB, together with connection attributes. |
| 112 | Ringing ? | Message from the second call server indicating incoming call to TB. May contain OLI, etc. |
| 114 | ANSwer | CIC |
| 116 | answer | TA may get this in-band |

As will be understood, an exemplary address format for each phantom terminal is typically arranged to be a special case of the format used for real (i.e. physical rather than imaginary) terminals. As such, a preferred embodiment of the present invention uses an ASN.1 Object Identifier to identify phantom trunks. Alternatively, a partitioned E.164 address or a superset of E.164 may be utilised, while for a simple SS7-based implementation the tuple (OPC, DPC, CIC) can uniquely identify a trunk (whether real or phantom). However, as will be appreciated, another scheme is needed for non-SS7 terminals, such as telephones. For example, the CIC field could be extended to 32 bits (rather than the normal 16 bits) and DPC can then be equated to OPC to identify a "line" type of a terminal while the CIC can be used to identify the line on the exchange. Generally, however, the only requirement for establishing a phantom trunk is for the connection broker to appropriately tag and record (in the terminal number data base 69) such a phantom trunk as either incoming or outgoing.

Turning again to the general architecture of FIG. 2, a particular embodiment of the present invention utilises an ATM network and the International Telecommunications Union, Telecommunications Section (ITU-T) signalling system No. 7 to implement the broadband network and narrowband control signalling, respectively.

Particularly, a narrowband node utilises the ISDN User Part (ISUP) of ITU-T signalling system no. 7 to communicate with other exchanges (e.g. narrowband network 52) to support multi-node operation. The exchange terminates some narrowband lines directly and terminates narrowband trunks via trunk network adapter 46 connected to an Asynchronous Transfer Mode (ATM) network 48. The trunk network adapter 46 translates bearer channels to an ATM scheme, with a one-to-one relationship existing between each bearer channel and an ATM virtual channel (VC). Typically, the broadband network edge switches 50, 60–62 and hence the trunk network adapters 46, 56–58 are connected to the ATM network 48 using ATM Forum User to Network Interface (UNI) version 4.0 interfaces for the traffic bearer channels and the control lines 51, while the connection brokers establish Q.2931 connections 51 to trunk network adapters 46, 56–58 using the proxy signalling option of UNI 4.0.

Narrowband signalling to other exchanges can use either existing narrowband connections or can be routed via network adapters (e.g. 46, 58) and the broadband network using either circuit emulation or frame forwarding. The concept is applicable to both fully and quasi-associated signalling schemes. Connections to another mixed mode node are implemented in a similar fashion.

Each trunk network adapter is arranged to have a unique ATM address (NSAP) such that a specific terminal is identified by the Network Service Access Point (NSAP) address of its network adapter, together with the ATM VPI/VCI that it transmits and receives on, i.e. the Virtual Path Identifier (VPI) and Virtual Channel Identifier (VCI).

As will now be understood, the connection broker 44 passes narrowband-to-narrowband requests to the narrowband switching fabric 16, whilst broadband-to-broadband connections (within the same node) are established using proxy signalling to set-up the connection directly. For narrowband-to-broadband connections, two requests are needed; one to the narrowband switching fabric 16 and one to the broadband network edge switches 50, 60–62. However, for a broadband-to-phantom terminal connection, the connection broker passes the connection request to the second connection broker (reference numeral 70 of FIG. 3) at the other end of the phantom route. The connection is then made by using a proxy signalling scheme emanating from the second connection broker 70. It should be noted that the present invention envisages that the phantom terminals are implemented as broadband terminals, and so a narrowband-to-phantom terminal connection is handled as a combination of a narrowband-to-broadband connection and a broadband-to-phantom terminal connection.

It will also be appreciated that the service inter-working function provided by the present invention is also applicable to networks that have intermediately coupled broadband networks. In this instance, the interconnection between call servers can provide gateway functions, such as billing and screening, while the connection brokers permit end-to-end connections between the narrowband terminals. Similarly, signalling inter-working functions not otherwise available to respective narrowband networks can be provided by connecting call servers together via the phantom trunks.

In summary, the second connection broker recognises two connection requests have been received to the opposite ends of the same phantom trunk, and in response thereto establishes a direct route through the broadband network between the first subscriber terminal 12 and the second subscriber terminal 85.

The present invention therefore advantageously provides a mechanism for the interconnection of mixed nodes through an intermediate broadband network which is otherwise unable to interpret and therefore unable to support the control channel signalling protocols separately utilised within the narrowband networks. Such operation could be supported, for example, by a modified trunk network adapter (of a broadband network) equipped with narrowband signalling software, but generally occurs between different infrastructure exchanges. Consequently, by employing the mechanism of the preferred embodiment to establish a common control channel, the modified trunk network adapter can support a narrowband traffic resource to participate in narrowband services without requiring the intervention of a signalling interworking function.

Beneficially, the combination of phantom trunks and the connection broker architecture results in a system implementation that requires no modifications to present narrowband signalling schemes and which supports all narrowband services. Additionally, only minimal changes are required to existing narrowband call servers. Indeed, the present invention provides a system that is scaleable to arbitrarily complex networks and which can operate over any underlying connection fabric including TDM, ATM or Frame Relay.

What is claimed is:

1. A call server for controlling connection of a calling communication device associated with a first narrowband network and an addressed communication device associated with a second narrowband network, connection of the calling communication device and addressed communication device occurring across at least one broadband network and wherein the narrowband networks have differing signalling protocols to those of the broadband network, the call server comprising:

means responsive to a call request message generated by the calling communication device, the call request message containing an address of the calling communication device and a destination address associated with the addressed communication device;

means to identify a first circuit identity associated with a first communication circuit used to send the call request message to the call server;

means for selecting a phantom trunk different to the first communication circuit, the phantom trunk having a second circuit identity and being arranged to support a narrowband communication between the first narrowband network and the second narrowband network;

means for sending, in a first message, the destination address and the second circuit identity from the first narrowband network to the second narrowband network;

means for sending, in a second message, the second circuit identity and the address of the calling communication device to the second narrowband network; and means for sending a command to a connection broker connectable, in use, to the call server, the command specifying two end-points to be connected and wherein the end-points are real terminals, phantom trunks or any combination thereof, said end-points being specified using an uniform abstraction independent of a type of communication connection to be established; and such that, in use, the connection broker is arranged, in use, to identify the presence of the second circuit identity in both the first message and the second message to establish that the communication connection is between the calling communication device and the addressed communication device.

2. The call server according to claim 1, wherein the connection broker is integrated with the call server and wherein the call server further includes means for establishing the communication connection through the at least one broadband network.

3. A computer program product for controlling connection of a calling communication device associated with a first narrowband network and an addressed communication device associated with a second narrowband network, connection of the calling communication device and addressed communication device occurring across at least one broadband network and wherein the narrowband networks have differing signalling protocols to those of the broadband network, computer program product comprising:

code that identifies a first circuit identity associated with a first communication circuit used to send a call request message to a call server;

code that selects a phantom trunk different to the first communication circuit, the phantom trunk having a second circuit identity and being arranged to support a narrowband communication between the first narrowband and the second narrowband network;

code that causes the sending, in a first message, of the destination addresses and the second circuit from the first narrowband network to the second narrowband network;

code that causes the sending, in a second message, of the second circuit identity and the address of the calling communication device to the second narrowband network; and code that causes the sending a command to a connection broker connectable, in use, to the call server, the command specifying two end-points to be connected and wherein the end-points are real terminals, phantom trunks or any combination thereof, said end-points being specified using an uniform abstraction independent of a type of communication connection to be established; and such that, in use, the connection broker is arranged, in use, to identify the presence of the second circuit identity in both the first message and the second message to establish that the communication connection is between the calling communication device and the addressed communication device;

wherein the code resides in a computer readable medium.

4. A computer program product for controlling connection of a calling communication device associated with a first narrowband network and an addressed communication device associated with a second narrowband network, connection of the calling communication device and addressed communication device occurring across at least one broadband network and wherein the narrowband networks have differing signalling protocols to those of the broadband network, the calling communication device and the addressed communication device each having an address, the connection broker coupled, in use, to a call server that is responsive to a call request message generated by the first narrowband communication unit, the call request message containing the address of the first narrowband communication unit and a destination address associated with the second narrowband communication unit, the call server being arranged to identify a first circuit identity associated with a first communication circuit used to send the call request message to the call server and having means for selecting a phantom trunk different to the first communication circuit, the phantom trunk having a second circuit identity and being arranged to maintain a narrowband communication between the first narrowband network and the different narrowband network, the call server further including means for sending, in a first message, the destination address and the second circuit identity from the first narrowband network to the second narrowband network, the computer program product comprising:

code that causes sending, in a second message, of the second circuit identity and the address of the first narrowband communication unit to the second narrowband network;

code, responsive to the receipt of the first message and the second message, for identifying the presence of the second circuit identity in both the first message and the second message to establish that the communication connection is between the first narrowband communication unit and the second narrowband communication unit; and code arranged to provide the call server with an uniform abstraction of a communication connection independent of a type of communication connection to be established;

wherein the code resides in a computer readable medium.

5. A method of establishing a communication connection across a broadband network from a first terminal in a first narrowband network to a second terminal in a different narrowband network, the broadband network having a signalling protocol dissimilar to those provided in the respective first and second narrowband networks, the method comprising the steps of:

at the first narrowband network and on a first communication circuit, receiving an incoming call request from the first terminal, the incoming call request containing a first circuit identity associated with the first terminal and a destination address associated with the second terminal;

selecting a phantom trunk different to the first communication circuit, the phantom trunk having a second circuit identity and being arranged to support a narrowband communication between the first narrowband network and the second narrowband network;

in a first message, sending the destination address and the second circuit identity from the first narrowband network to the second narrowband network;

in a second message, sending the second circuit identity and an address of the first terminal to the second narrowband network;

identifying the presence of the second circuit identity in both the first message and the second message to establish that the communication connection is between the first terminal and the second terminal, the first circuit identity and the second circuit identity specified using a uniform abstraction independent of a type of communication connection to be established; and establishing the communication connection through the broadband network.

6. The method of claim 5, wherein the first message carries only a part of necessary connection information pertaining to the first terminal and the second terminal.

7. The method of claim 6, further comprising the step of:
assigning a first phantom terminal at the first narrowband network;
assigning a second phantom terminal at the second narrowband network;
associating the circuit identity of the first message with the second phantom terminal; and
associating the circuit identity of the second message with the first phantom terminal.

8. The method of claim 7, further including the step of establishing a first phantom cross-office path between the first terminal and the first phantom terminal.

9. The method of claim 8, further including the step of requesting a second phantom cross-office path between the second terminal and the second phantom terminal.

10. The method of claim 9, further comprising the step of translating terminal addresses associated with the phantom cross-office paths to produce valid broadband network addresses.

11. The method of claim 10, wherein the circuit identity includes a circuit indicator code.

12. The method of claim 11, wherein the step of establishing the communication connection includes the step of, after establishing that the communication connection is between the first terminal and the second terminal, establishing a real connection between the second terminal and the broadband network.

13. The method of claim 12, further comprising the step of instructing the first narrowband network that the real connection between the second terminal and the broadband network is in place.

14. A communication system having a broadband network and a plurality of narrowband networks each containing at least one communication device, the narrowband networks having differing signalling protocols to those of the broadband network and wherein the narrowband networks are interconnected through the broadband network, the communication system arranged to establish a communication connection between a calling communication device in a first narrowband network and a receiving communication device in a different narrowband network, each of the at least one communication devices having an address, each of the plurality of narrowband networks comprising:

a call server responsive to a call request message generated by the calling communication device, the call request message containing the address of the calling communication device and a destination address associated with the receiving communication device, the call server being arranged to identify a first circuit identity associated with a first communication circuit used to send the call request message to the call server;

means for selecting a phantom trunk different to the first communication circuit, the phantom trunk having a second circuit identity and being arranged to support a narrowband communication between the first narrowband network and the different narrowband network;

means for sending, in a first message, the destination address and the second circuit identity from the first narrowband network to the second narrowband network;

means for sending, in a second message, the second circuit identity and the address of the calling communication device to the second narrowband network;

means for identifying the presence of the second circuit identity in both the first message and the second message to establish that the communication connection is between the calling communication device and receiving communication device, the first circuit identity and the second circuit identity specified using a uniform abstraction independent of a type of communication connection to be established; and means for establishing the communication connection through the broadband network.

15. The communication system of claim 14, wherein the first message carries only a part of necessary connection information pertaining to the calling communication device and the receiving communication device.

16. The communication system of claim 14, wherein the call server further comprises:

means for assigning a first phantom terminal, means for associating the circuit identity in the second message with the first phantom terminal; and means for associating the circuit identity in the first message with a second phantom terminal.

17. The communication system of claim 16, further comprising:

means for establishing a first phantom cross-office path between the calling communication device and the first phantom terminal; and means for requesting a second phantom cross-office path between the receiving communication device and the second phantom terminal.

18. The communication system of claim 17, further comprising means for establishing a real connection between the receiving communication device and the broadband network, and wherein said means for establishing the communication connection across the broadband network is responsive thereto.

19. A connection broker arranged to orchestrate interconnection of a first narrowband communication unit of a first narrowband network to a second narrowband communication unit of a different narrowband network via a broadband network, the broadband network having dissimilar signalling protocols to those provided in the respective first and different narrowband networks, the first narrowband communication unit and the second narrowband communication unit each having an address, the connection broker coupled, in use, to a call server that is responsive to a call request message generated by the first narrowband communication unit, the call request message containing the address of the first narrowband communication unit and a destination address associated with the second narrowband communication unit, the call server being arranged to identify a circuit identity associated with a first communication circuit used to send the call request message to the call server and having means for selecting a phantom trunk different to the first communication circuit, the phantom trunk having a second circuit identity and being arranged to maintain a narrowband communication between the first narrowband network and the different narrowband network, the call server further including means for sending, in a first message, the destination address and the second circuit identity from the first narrowband network to the second narrowband network, the connection broker comprising:

means for sending, in a second message, the second circuit identity and the address of the first narrowband communication unit to the second narrowband network;

a processor, responsive to the receipt of the first message and the second message, for identifying the presence of the second circuit identity in both the first message and the second message to establish that the communication connection is between the first narrowband communication unit and the second narrowband communication unit; and the connection broker being arranged to provide the call server with an uniform abstraction of a communication connection independent of a type of communication connection to be established.

\* \* \* \* \*